Oct. 11, 1966    A. M. BRENNEKE    3,277,702
VEHICLE DYNAMOMETER

Filed May 7, 1964    10 Sheets-Sheet 1

INVENTOR.
Arthur M. Brenneke,
BY Holgren, Wegner,
Allen, Stillman & McCord
Attorneys.

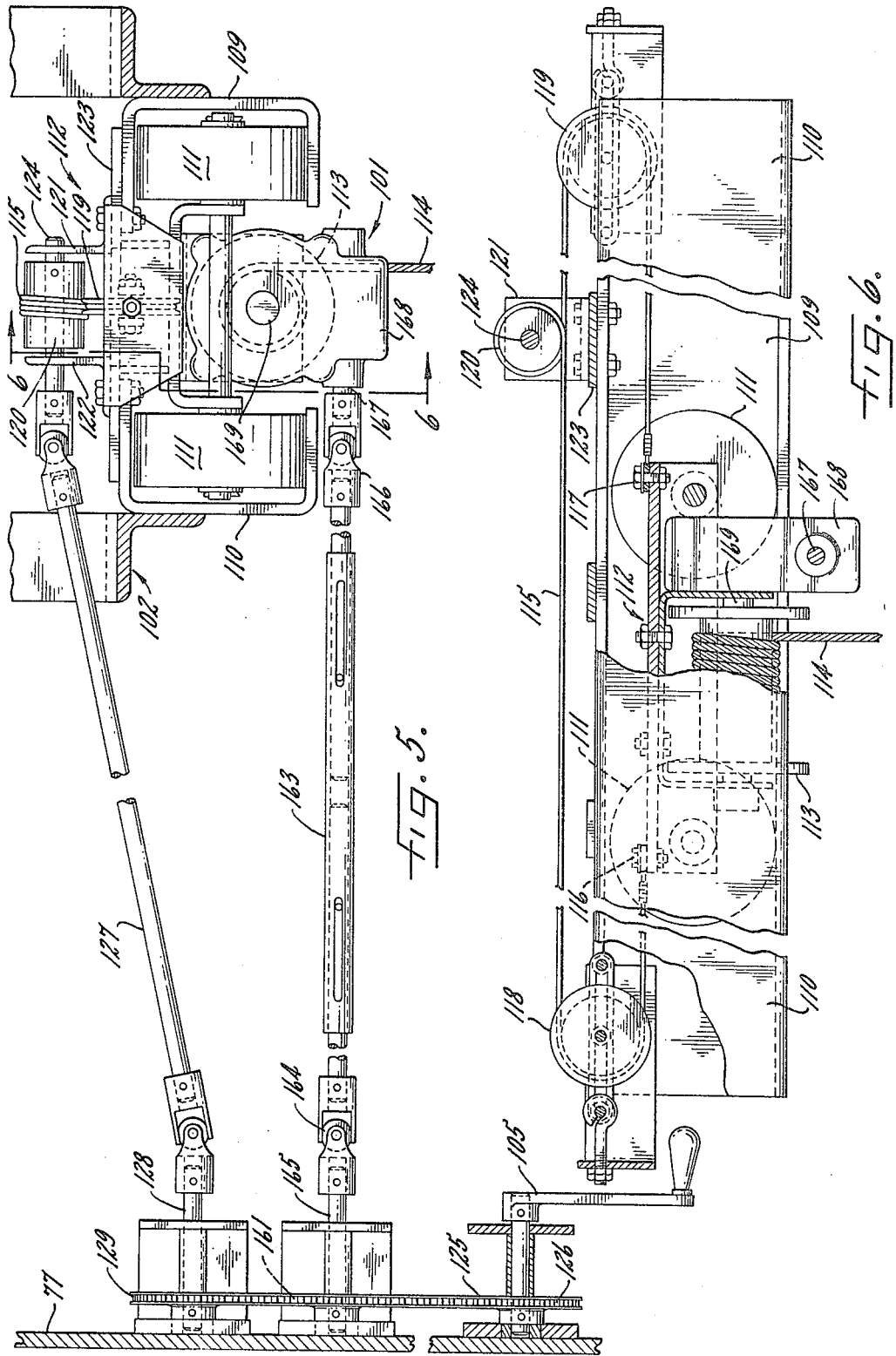

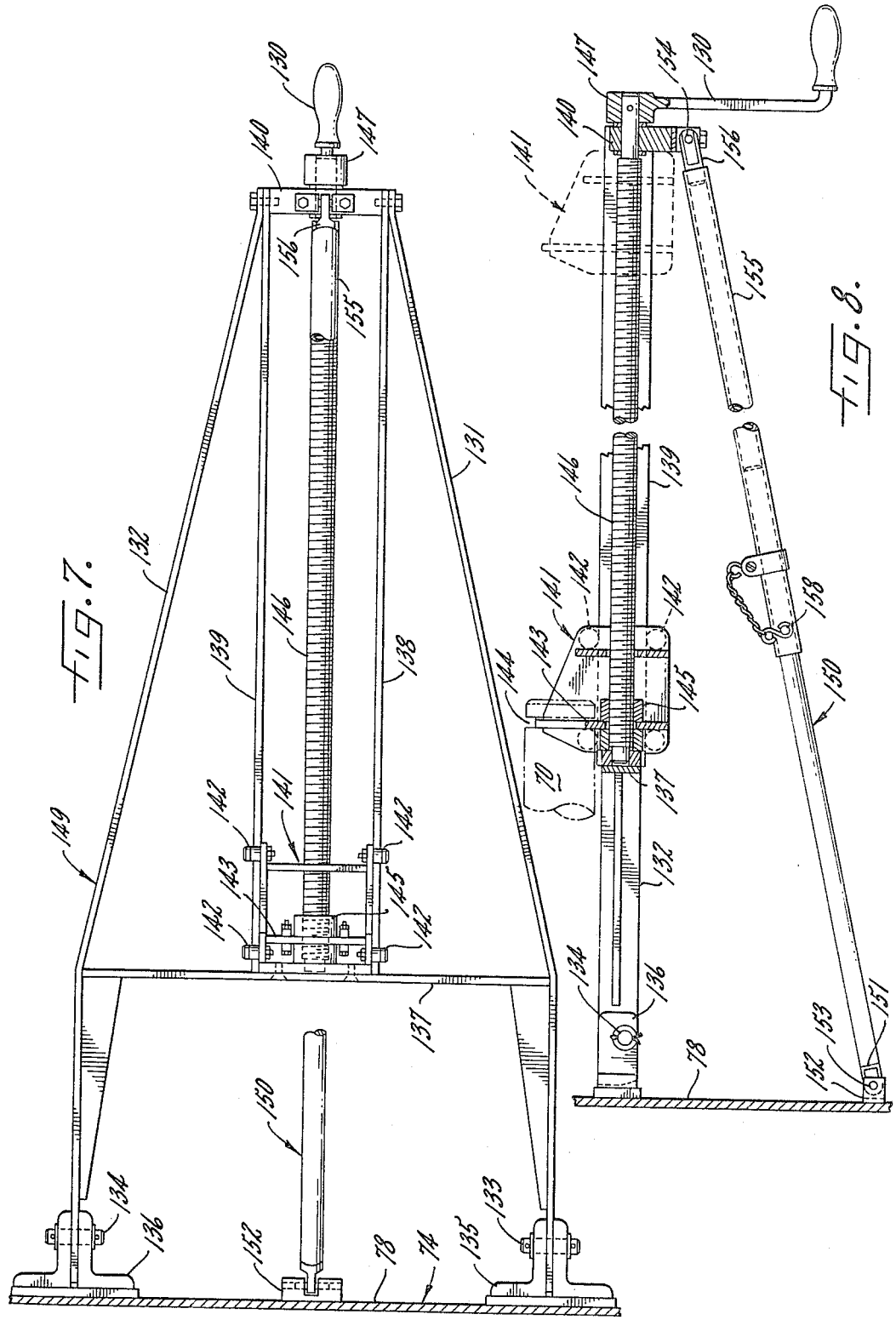

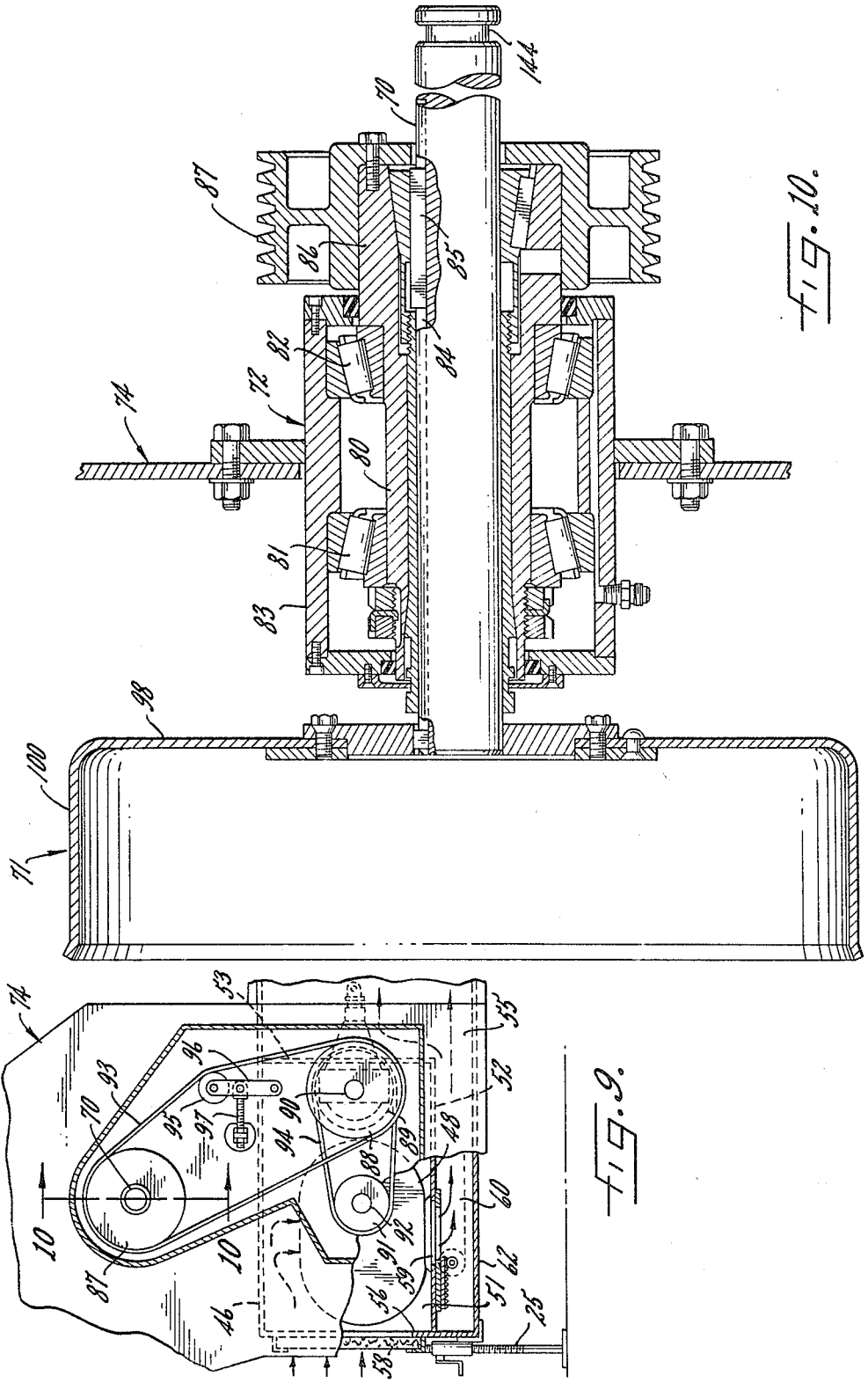

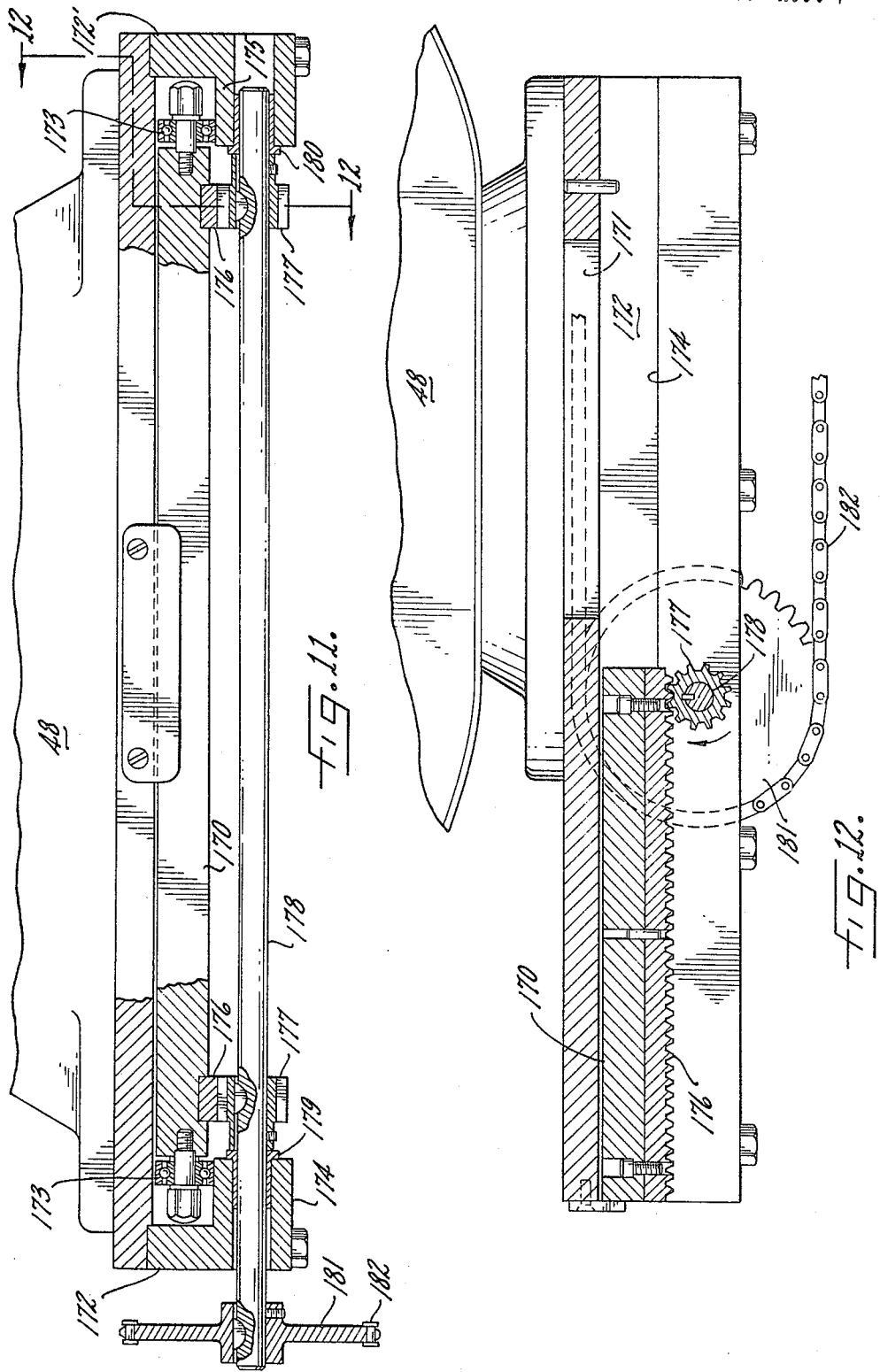

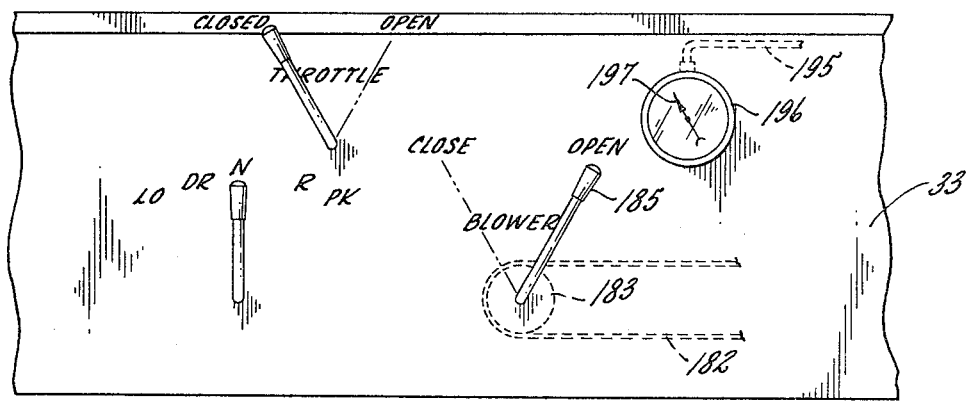
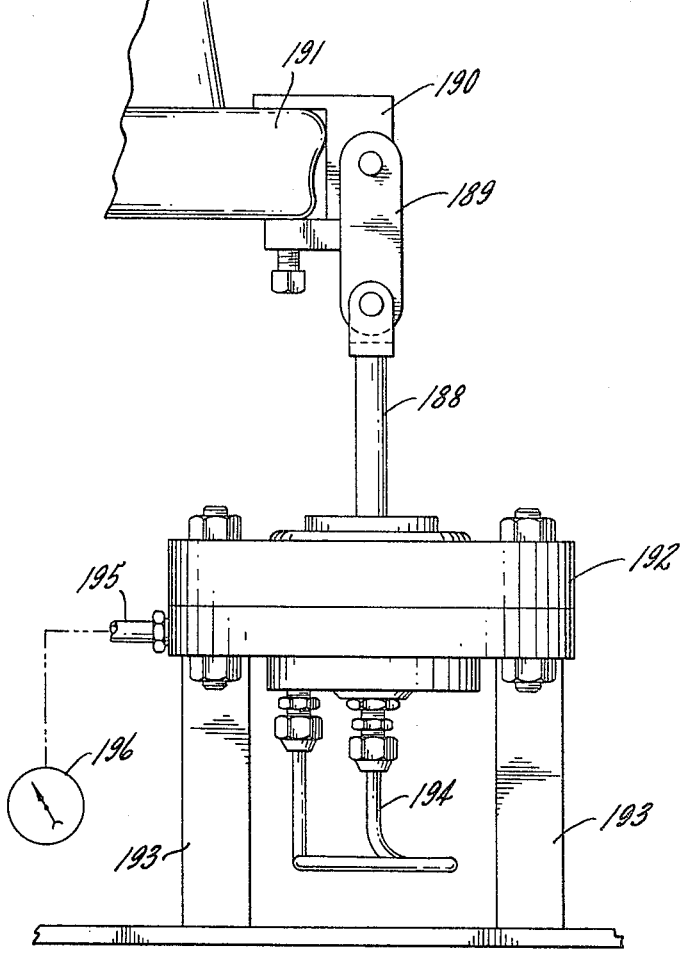

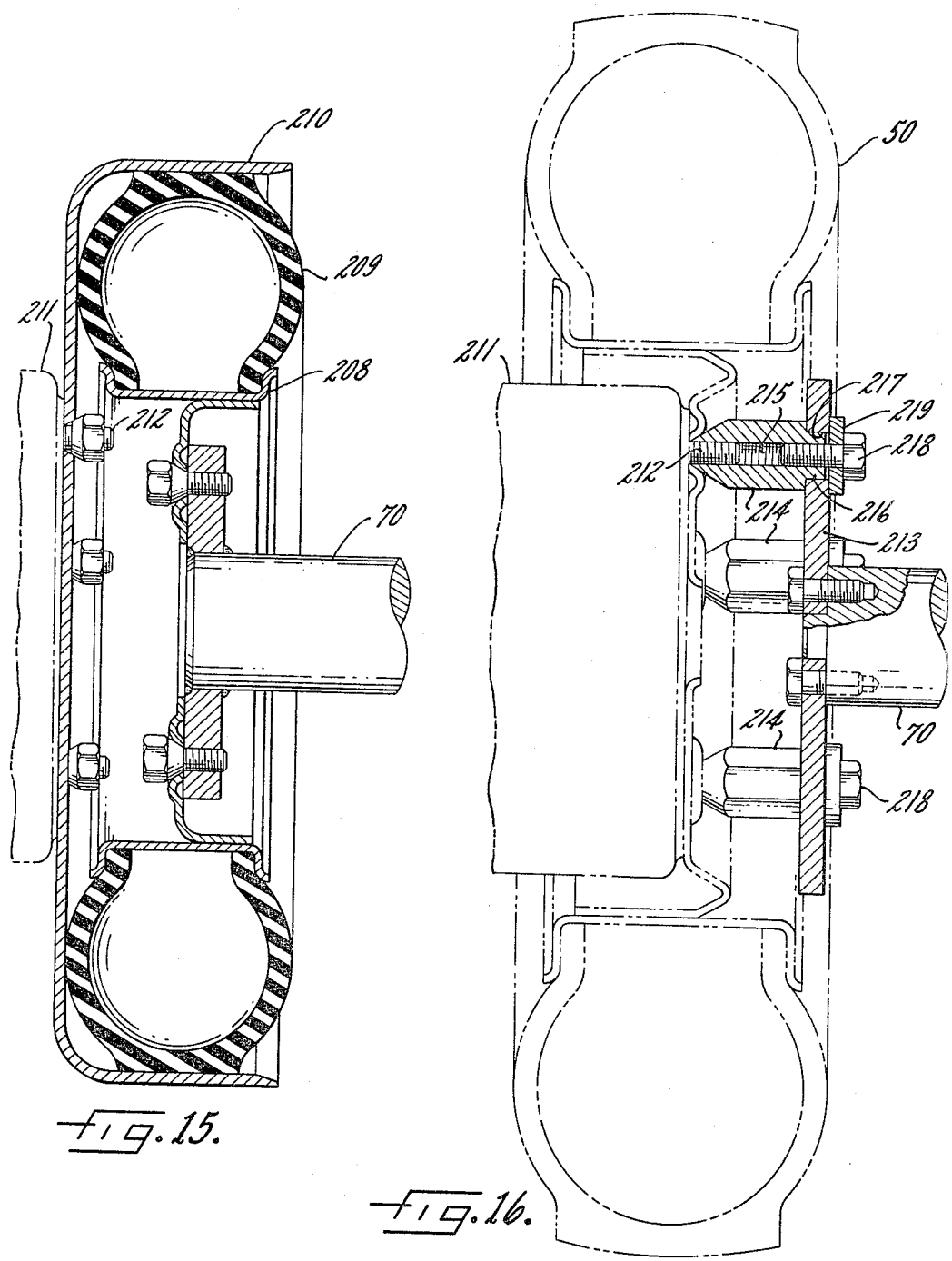

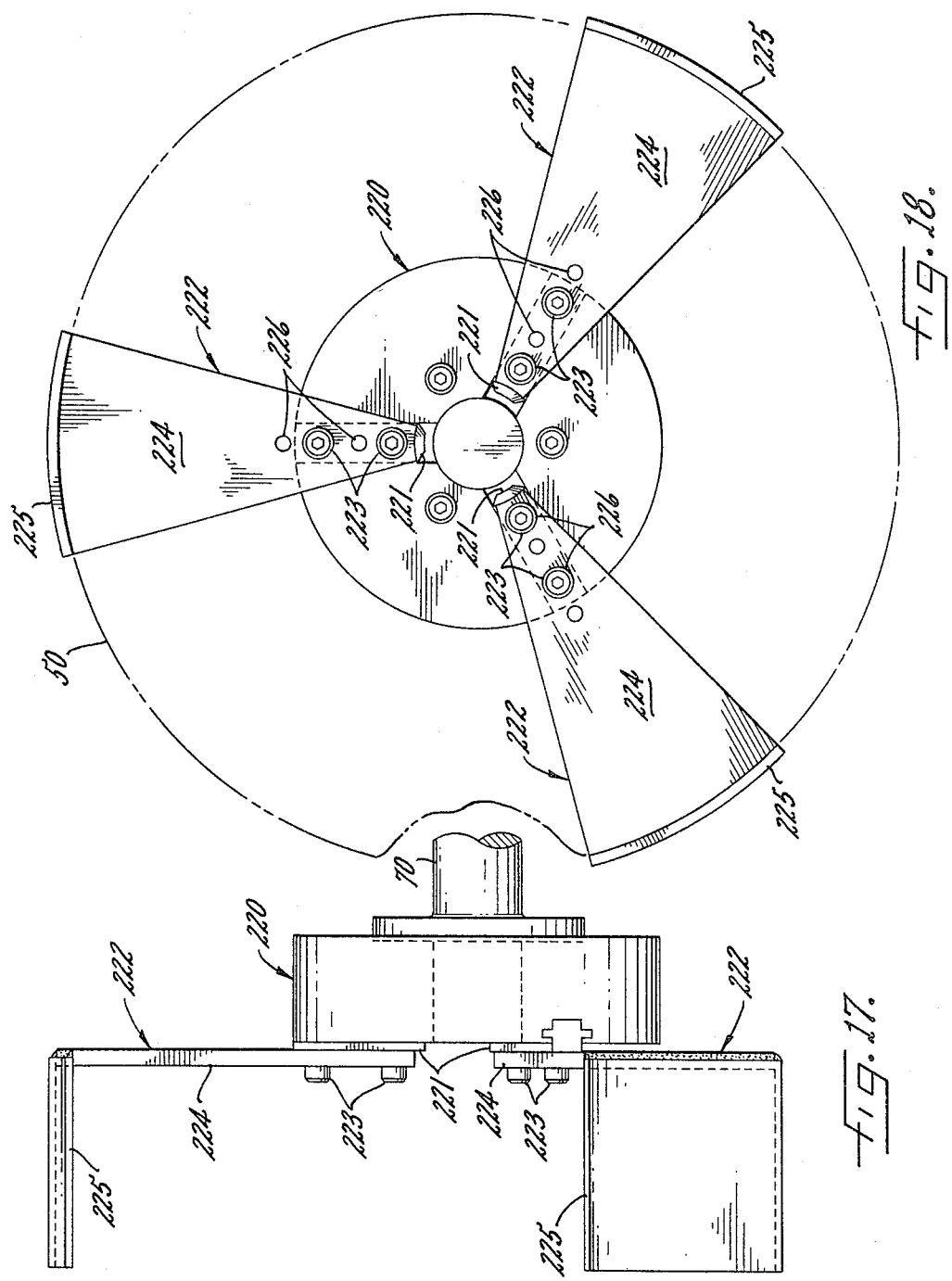

United States Patent Office 3,277,702
Patented Oct. 11, 1966

3,277,702
VEHICLE DYNAMOMETER
Arthur M. Brenneke, New Castle, Ind., assignor to Laboratory Equipment Corp., Mooresville, Ind., a corporation of Indiana
Filed May 7, 1964, Ser. No. 365,757
8 Claims. (Cl. 73—117)

This invention relates to a vehicle test apparatus, and more particularly to what is sometimes referred to as a chassis dynamometer, for use in performance testing of automotive vehicles.

Chassis dynamometers are widely used throughout the automobile industry for many research and development purposes requiring performance testing of complete vehicles. Generally they have a supporting structure for a vehicle, driven rolls which support and are driven by the drive wheels of the vehicle, and a power absorption unit connected to the rolls. Cooling facilities for the vehicle engine, a motor means for alternately driving the rolls, and other refinements are often included.

Modern highway and traffic conditions have resulted in increasing use of chassis dynamometers for all manner of vehicle performance and durability testing. This type of testing falls into two general types; the performance runs such as are made to check new vehicles coming off the assembly line or for checking and adjusting vehicles following an overhaul, and durability runs intended to simulate thousands of miles of road service. The latter type of testing is particularly necessary in research and development pertaining to motor fuels.

The invention has as its general object the provision of a vehicle test apparatus of new and improved construction and for use for durability or high mileage tests on vehicles.

It is a particular object of the invention to provide such an apparatus without the customary vehicle wheel driven rolls and to provide instead a new and highly efficient means for effecting a driving connection between the vehicle rear axles and a power absorption means.

Another object is to provide a vehicle test apparatus of compact and completely self-contained construction so as to be readily portable and designed to lower or virtually eliminate installation costs, and also to result in an apparatus of a minimum number of moving parts to assure maximum reliability and efficient operation.

A particular object of the invention is to provide a vehicle test apparatus having a power absorption means and rotatably supported connecting devices or adapters having driving connections to the absorption means and operable to connect concentrically to the wheels or the tires on the driving axles of a vehicle to be tested to provide a direct driving and supporting connection between the vehicle driving axles and said adapters.

Other objects include the provisions of such a test apparatus having driving connections to a power absorption means including connecting devices or adapters for receiving and gripping the driving wheel tires or other parts of the driving means of a vehicle, and more particularly, to provide cup-like devices connected to the power absorption means which are adapted to receive the tires on the vehicle driving wheels and to be engaged directly thereto by frictional contact and/or tire inflation; to provide such a test apparatus with power absorption means in the form of one or more blowers or compressors having controls for adjusting the air pressure to vary the loading on the vehicle under test; and further to provide such a vehicle test apparatus designed to support and restrain the vehicle so that all its torque reaction results in an upward or downward force on its non-driving wheels, thereby permitting measurement of the vehicle power by means of tire pressure or other simple indicators of force acting on the front or other non-driving wheels or other portions of the vehicle remote from the driving wheels.

Other objects will become readily apparent from the following detailed description taken in connection with the accompanying drawings wherein:

FIG. 4 is a sectional view along line 4—4 of FIG. 1.

FIG. 5 is a vertical sectional view along line 5—5 of FIG. 1.

FIG. 6 is a vertical section along line 6—6 of FIG. 5, with parts broken away.

FIG. 7 is an enlarged fragmentary view of a portion of FIG. 3.

FIG. 8 is a top view of the structure of FIG. 7, with parts broken away.

FIG. 9 is an enlarged fragmentary view of a portion of FIG. 1, with parts broken away.

FIG. 10 is a vertical sectional view taken along line 10—10 of FIG. 9.

FIG. 11 is an enlarged fragmentary view of a portion of FIG. 3, with parts broken away.

FIG. 12 is a sectional view of the blower valve of FIG. 11 taken along line 12—12 of FIG. 11.

FIG. 13 is a partial side elevational view of the frame of the apparatus showing the controls;

FIG. 14 is an enlarged fragmentary view of a portion of FIG. 1, showing one form of means for measuring force on the front of a vehicle;

FIGS. 15, 16 and 17 are views similar to FIG. 10 illustrating modifications; and FIG. 18 is a view looking at the left-hand end of FIG. 17.

In general, the invention is shown as comprising a trailer-like frame mounted on wheels and adapted to be moved from place to place, the upper portion of the frame providing a platform onto which a vehicle may be placed. An overhead structure at the rear end of the frame carries a hoist for raising the rear or driving wheels of a vehicle when positioned on the frame.

Figure 1:
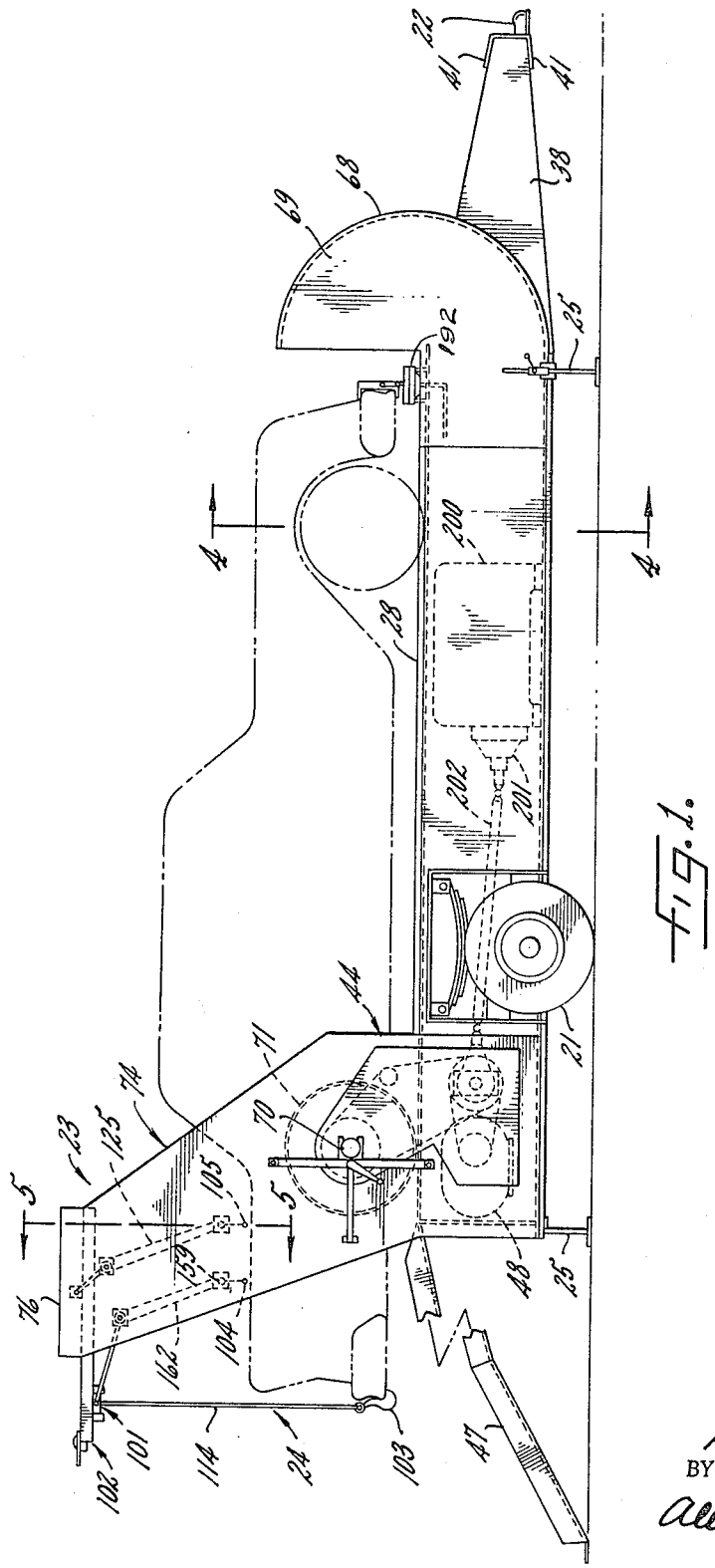
FIG. 1 is a side elevational view of a preferred form of a vehicle test apparatus embodying the invention, with a vehicle outlined in an operating or test position.

As shown in the drawings, the invention comprises a trailer-like frame 20 having a pair of spring mounted wheels 21 toward the left-hand (rear) end looking at FIGURE 1, and a hitch means 22 at the right-hand (front) end thereof. The balance of the equipment is carried on this trailer frame so that it is readily transportable from place to place. The frame includes an overhead portion 23 at the rear thereof on which a hoisting mechanism 24 is carried for the purpose of raising the end of the vehicle when it is in position for test. To render the frame rigid and immovable when in use, leveling and supporting jacks 25 are provided at forward and rearward positions on each side of the frame.

In the preferred form of the invention, the frame 20 comprises a pair of box-like hollow side sections 26 and 27 having top plates 28 and 29, respectively, which form portions of a platform for receiving a vehicle. As shown best in FIGURE 4, the side sections have bottom plates 30 and 31, which, together with the vertical outer side plates 32 and 33 and inner side plates 34 and 35, form longitudinally extending ducts 36 and 37 for a purpose hereinafter described in more detail. At their forward ends, as shown to the right in FIGURES 1 and 2, channel members 38 and 39 are joined to the front ends of the box sections which are closed at their forward ends by a cross plate 40. The forward ends of the channels 38 and 39 are reinforced by top and bottom plates 41 and an end plate 42 which carries the hitch means 22.

Figure 2:
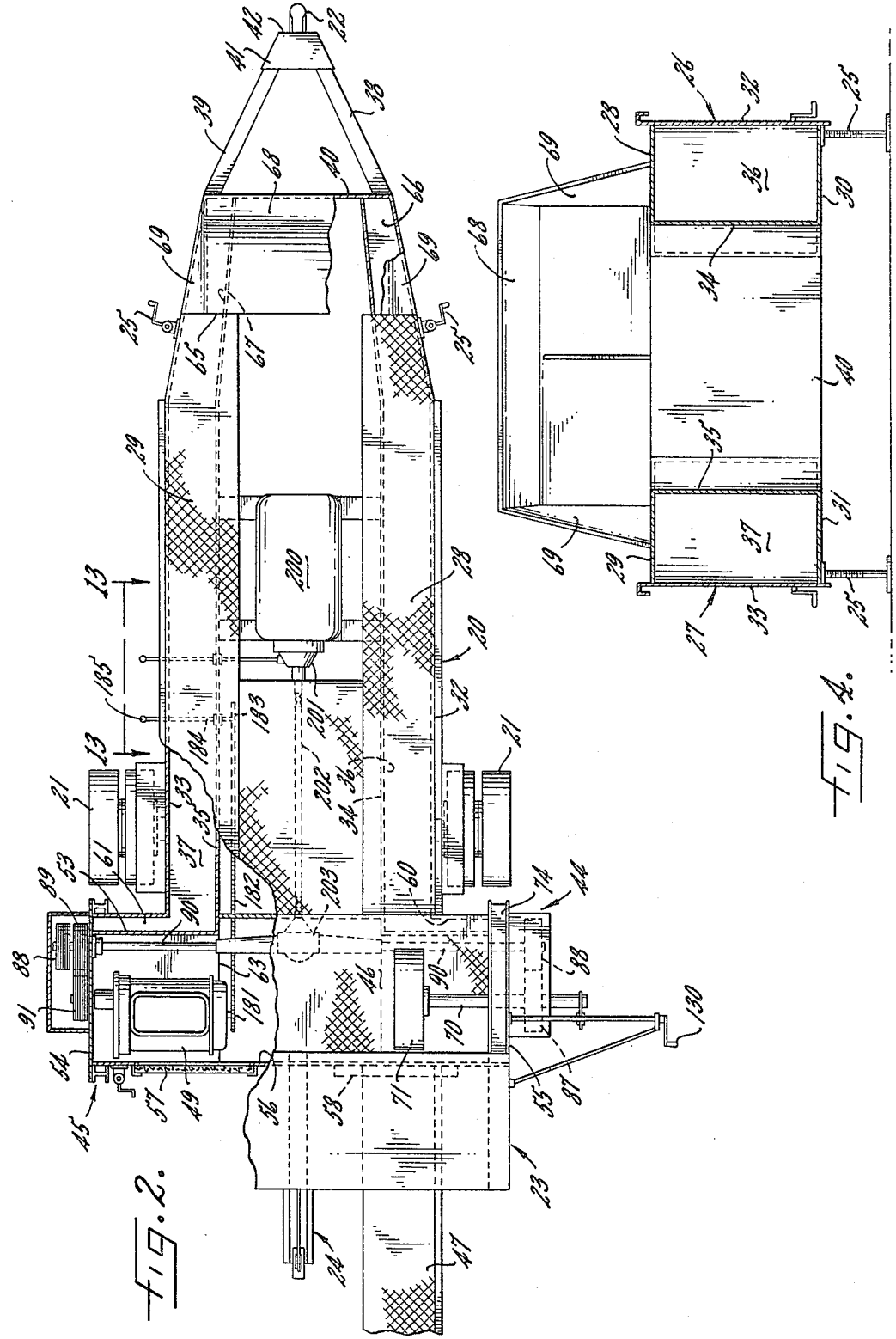
FIG. 2 is a top view of the apparatus of FIG. 1 with parts broken away.

At its rear or left-hand end as shown in FIGURES 1 and 2, the frame has side extensions 44 and 45 and a top plate 46 extending across the entire rear portion of the frame and said extensions. It will be evident that this top plate together with the plates 28 and 29, form a platform for receiving the vehicle on test. A pair of ramps 47 is provided to facilitate loading a vehicle onto the platform.

In its preferred form the invention comprises a means for placing a load on the engine of the vehicle being tested and means for measuring the performance of the engine together with a new and improved means for connecting the vehicle engine to the load producing means to enable efficient operation and accurate testing of the vehicle engine, drive line, fuels and lubricants under infinite combinations of speed and load and a wide variation in programmed runs.

The load producing means includes a pair of air compressors 48 and 49, supported within the frame 20 at its rear end and approximately under the rear wheels 50 of a vehicle positioned on the platform 46. The compressors are provided with air outlet controls as described hereinafter, for varying the load placed on a vehicle engine. The compressors are located in a chamber 51 (FIGURE 3 and 9) extending across the frame 20, and which is enclosed on the top by the platform plate 46, on the bottom by plates 52, toward the front by transverse vertical plates 53, and on the side by plates 54 and 55 which also form the outer walls of the rear portion of the frame 20. The rear wall of the chamber is formed by a plate 56 extending across and forming the rear end of the frame 20, this wall of the chamber having two inlet openings provided with air filters 57 and 58. The outlets 59 for the compressors are at the bottom thereof as shown in FIGURE 9 and exhaust into discharge passages 60 and 61, one for each compressor, extending forwardly of the frame between plates 52 and a bottom frame plate 62. The passage 60 has on inner side wall 63 (FIGURE 3) and plate 55 as an outer side wall. Passage 61 has an inner side wall 64 and plate 54 as an outer side wall. The rear ends of the passages are closed by the plate 56 (FIGURES 2, 3 and 9) so that the passages 60 and 61 discharge forwardly or toward the right in FIGURE 2 into passages 36 and 37 formed by the box sections of the frame. The top plates 28 and 29 of the box sections terminate at 65, short of the front transverse plate 40 (FIGURE 2), which forms the front end of frame and closes the front ends of the box sections. This provides outlets 66 and 67 for the passages 36 and 37, and through these outlets the air from the compressors is directed upwardly and rearwardly as seen best in FIGURE 1 by an arcuate baffle 68 which forms the front end wall of the box sections and directs the air rearwardly toward the radiator of the vehicle for engine cooling purposes. The adjacent portions of the outer side walls 32 and 33 have upwardly extending portions 69 to assist in directing the air toward the vehicle radiator.

The means for driving the compressors by the engine of the vehicle will now be described with references to FIGURES 1 to 3, 9 and 10. This means comprises generally a pair of shafts 70 coaxially supported in bearing housings 72 secured to the upright frame elements 74 and 75, a separate driving connection between each shaft and a compressor, and means for connecting each shaft to one of the rear axle shafts of the vehicle to be tested, herein shown as cup-like adapters 71 and 73.

As shown, the upright frame elements 74 and 75 extend alongside of and upwardly from the rear and wider portion of the frame 20 and are connected at their upper ends by a cross beam 76. Generally, the frame elements each comprise spaced inner and outer parallel plates 77 and 78 secured together by a surrounding narrow plate or channel 79.

As shown in FIGURE 10, the shaft 70 is splined to a sleeve 80 which in turn is rotatably supported by bearings 81, 82 in the bearing housing 83. The shaft has a longitudinal groove 84 in which a key 85 fits and which is carried on the sleeve 86. Thus, the shaft may be moved, as by means hereinafter described, axially toward and away from the other shaft 70 (FIGURE 3) which is similarly mounted in the other upright frame element 75.

Each driving connection comprises a pulley 87 on the sleeve 86, pulleys 88 and 89 on an intermediate shaft 90 (FIGURE 9), a pulley 91 on the compressor shaft 92, and V-belt systems 93 and 94. An idler pulley 95 for the V-belt system 93 is carried on the free end of a pivotally supported arm 96 which is adjustable by a screw threaded device 97.

The inner ends of the coaxial shafts are herein arranged to be driven by the engine of the vehicle under test by connecting means in the form of the adapters 71 and 73 fixed on the inner ends of the shafts 70 and each having an annular inner wall 100 of a diameter to receive a tire of the rear wheel of the vehicle. Thus, by driving a vehicle up the ramp 47 and onto the platform formed by plates 28, 29 and 46 until the rear axles of the vehicle are intermediate and directly below the shafts 70, and then raising the vehicle axles until they are coaxial with the shafts, the tires and the shafts 70 may be moved toward each other to enter the tires into the cups, and thereby the compressors are connected to be driven by the vehicle engine.

To facilitate connecting the vehicle rear axles to drive the compressors, a hoist 101 is mounted on a beam 102 extending rearwardly from the cross beam 76, the hoist having a cable carrying a hook 103 which may be secured to the rear bumper or other suitable part of the vehicle. A manual handle 104 is adapted to operate the hoist cable. A similar handle 105, through suitable intermediate connections, is adapted to adjust the hoist along the beam 102. These manual controls are described more fully hereinafter.

As shown more fully in FIGURES 5 and 6, the cantilever beam 102 comprises a pair of laterally spaced and opposed channel members 109 and 110 forming tracks for the wheels 111 of a carriage 112, on which a reel 113 is rotatably supported for a hoist cable 114. The carriage 112 is adapted to be adjusted longitudinally of the cantilever beam by means of a cable 115 which has its ends secured at 116 and 117 to the carriage and its intermediate portion passed over a pair of longitudinally spaced pulleys 118 and 119 and an intermediate drum 120 over which the cable has several wrap-around turns. The drum 120 is rotatably mounted on a pair of brackets 121 and 122 extending upwardly from a plate 123 joining the upper flanges of the channels 109 and 110, a shaft 124 for the drum being adapted to be driven by a hand crank 105 (FIGURES 1 and 3), and intermediate connections comprising a chain 125 passing over a sprocket 126 on the hand crank shaft, and a second sprocket rotatably supported on the frame upright 77 and a drive shaft 127 connecting at one end with a shaft 128 of the upper sprocket 129 and at its other end with the shaft 124 of the drum 113.

It will be readily apparent that by turning the hand crank 105 in opposite directions the drum 120 will be rotated in opposite directions to move the hoist carriage back and forth on the cantilever beam.

The hoisting cable reel 113 is also arranged to be operated manually by the hand crank 104 which is rotatably mounted on a shaft 159 on the frame upright 74. This shaft carries a sprocket 160 which is connected to a sprocket 161 on an upper parallel shaft 165 by means of a chain 162, the upper shaft being rotatably mounted on the frame upright and being connected to the cable reel 113 by means including a telescopic shaft device 163, a universal joint 164 connecting one end of the telescopic shaft to the shaft 165, a universal joint 166 connecting the other end of the telescopic shaft to a shaft 167 rotatably supported on a depending member 168 of the carriage 112. Said shaft and a shaft 169 carrying the reel 113 are connected by a worm and worm wheel (not shown) to complete the driving connection and to provide means for preventing the weight of the test vehicle from driving the hoist reel reversely to permit the vehicle to be lowered.

Figure 3:
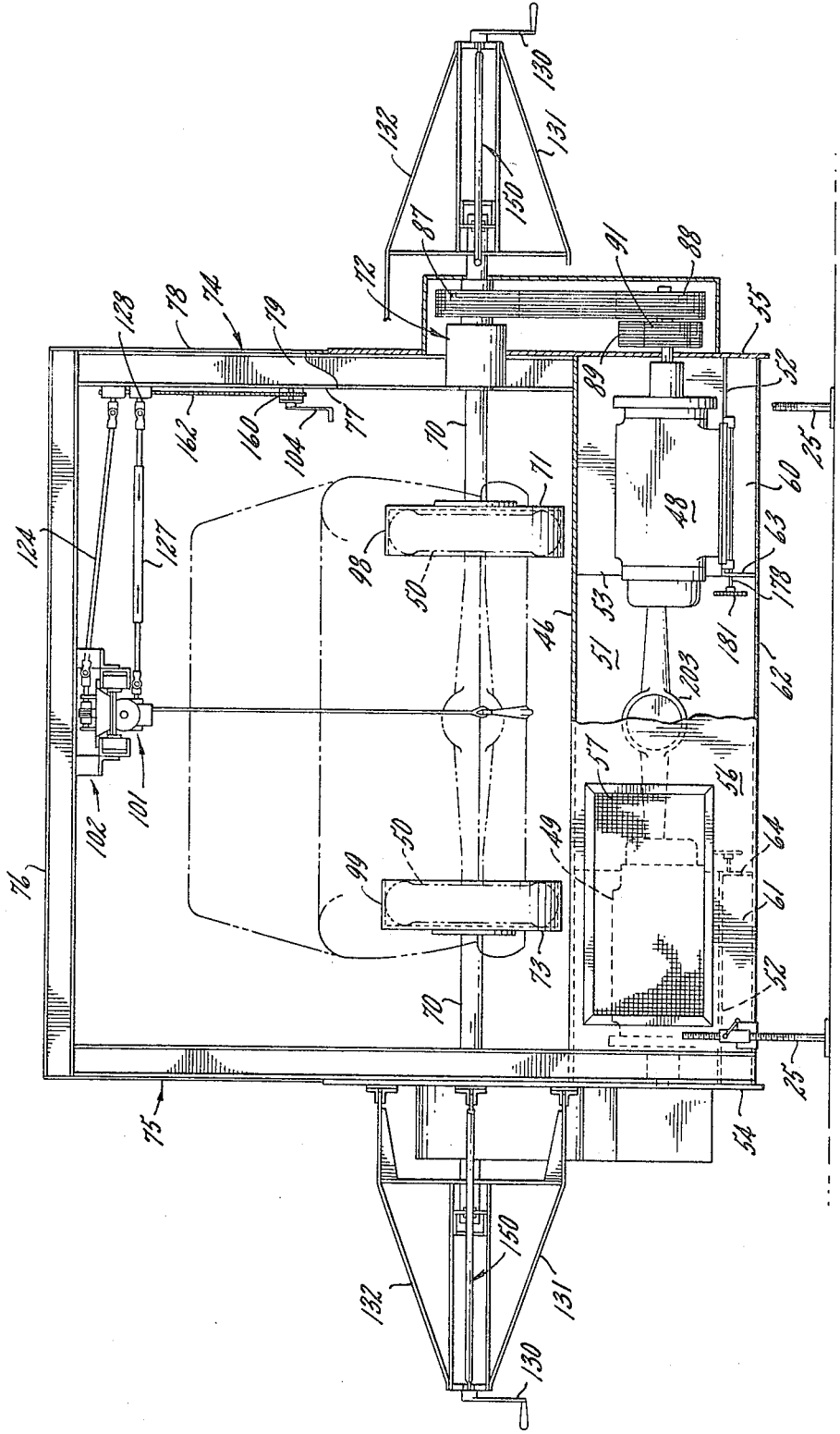
FIG. 3 is a rear elevation looking at the left-hand end of the apparatus of FIG. 1 with parts broken away.

For adjusting the coaxial shafts 70 to move the driving chucks toward each other for effecting a driving connection with the vehicle tires and from each other for disengaging the chucks from the tires, the invention provides a pair of hand crank devices indicated generally at 130 in FIGURES 1 to 3 and more fully in FIGURES 7 and 8. Each device comprises a frame having somewhat longitudinally extending members 131 and 132 which, as shown in FIGURE 7, are pivotally connected at their left-hand ends by means of pins 133 and 134 to brackets 135 and 136 secured to the plate 78 of the upright frame element 74. The frame includes a cross member 137 which supports the left-hand ends of a pair of guide track members 138 and 139, and a cross member 140 at the outer end of the frame which also supports the other ends of the track members so that the tracks are in laterally spaced and parallel relation as shown best in FIGURE 7. A carriage or slide 141 is movably mounted on the tracks by means of a plurality of rollers 142, four of which are mounted on the carriage at the four corners thereof above the tracks and another four of which are mounted at the four corners of the carriage below the tracks, so as to guide the carriage along the track during its movement. The carriage also has thereon a shaft clutching member 143, a portion of which extends into an annular recess 144 in the adjacent end of a shaft 70 when the adjusting device is in its operative position as shown in FIGURES 7 and 8. The carriage also has secured thereto a nut device 145 which engages a manually operable screw threaded shaft 146, one end of which is rotatably mounted in the cross member 140 and has a projecting portion 147 extending beyond the cross member and secured to the hand crank 130. Thus, by rotating the hand crank and the screw shaft 146, the carriage may be moved back and forth on the tracks 138 and 139 to move the shaft 70 from one end of the track to the other in order to adjust the corresponding tire adapter 71.

The frame 149 is held in its extended position as shown in FIGURES 7 and 8 by means of a brace bar 150, one end 151 of which is pivotally secured to a bracket 152 on the frame plate 78 by a pivot pin 153. The other end of the brace bar is secured to a portion of the cross member 140 by means of a pin 154. The brace bar is made up of a tube 155 secured to the pin 154 by a short rod 156 and a rod 157 which telescopes into the tube and may be secured to the tube in the adjusted position shown in FIGURE 8 by means of a pin 158. Upon removing the pin 158, the frame of the adjusting device may be swung about the pivots 133 and 134, the tube 155 and rod 157 telescoping to shorten the brace bar and permit the adjusting device to swing into a position parallel to the frame upright element 74. Swinging the frame from the position shown in FIGURE 8 disengages the clutching member 143 from the recess 144 in the shaft 70. It will be understood that the device on the opposite side of the apparatus is similarly constructed and operable to adjust the other tire chuck.

As mentioned hereinbefore the compressors are provided with valves for controlling the passage of air therethrough. As shown more fully in FIGURES 11 and 12, the compressor 48 has a valve plate 170 for controlling the outlet port 171 of the compressor which is located in the bottom surface of the compressor casing. This valve plate is slidably supported on a pair of opposed and parallel rails of L-shaped cross section 172 and 172', the plate having a plurality of antifriction rollers 173 at its four corners arranged to roll on the horizontal flanges 174 and 175 of said rails. Rack members 176 are suitably secured to the valve plate along its opposite edges. These racks are engaged and arranged to be driven by means of pinions 177 carried on a shaft 178 which is rotatably supported on sleeve bearings 179 and 180 in the horizontal flanges of the rails, and carries a sprocket 181 at its left-hand end as shown in FIGURES 3 and 11. As shown in FIGURE 2, a chain 182 passes over the sprocket 181 and also over another sprocket 183 carried on a shaft 184 rotatably mounted in the side frame member 35 and which is provided with a handle 185 on its outer end operable to turn the shaft 178, through the chain 182 and sprocket 181, to adjust the valve plate of the compressor 48. A similar manual control mechanism (not shown) is provided for the other compressor valve by connection to its operating sprocket 181 shown in FIGURE 3.

In the form shown in the drawings, the means for measuring the force in an upward or downward direction on the forward end of the vehicle is shown as a thrust measuring device, which in FIGURE 14 has an input rod element 188 connected by means of a link 189 to a clamp 190 secured to the bumper 191 of the vehicle under test. The casing 192 of the thrust measuring device is suitably mounted on the top of the frame by means of a plurality of post elements 193. The rod 188 functions through a suitable piston and cylinder device within the casing 192 to control the pressure of fluid in the cylinder, the outlet of which is connected by a tube 194 through a suitable port in the casing to a tube 195 which connects with an indicating meter device 196, a pointer 197 of which operates during the test of a vehicle to show the relative amount of thrust of the forward end of the vehicle downwardly or upwardly, depending upon the direction of rotation and torque of the connected wheels of the vehicle.

A power source, preferably such as an internal combustion engine 200, is provided and equipped with a torque converter drive 201. A shaft 202 extends from the torque converter to a differential 203 which connects to the shafts 90 of the drive connections between the adapters 71 and the compressors. The engine 200 operates continuously at system speed and is normally throttle-controlled. It may also function as an absorber of power from the vehicle engine to the extent it acts as a compressor when its throttle is closed. In performing full throttle, low speed acceleration tests on the test vehicle, adjusting the torque converter into low range can further increase the power absorption capacity of the engine 200.

By taking the power directly from the driving axles of the vehicle through the adapters which are on shafts concentric with the axles, all torque reaction is caused to result in an upward or downward force at the front wheels of the vehicle illustrated, upward when the engine is producing power and downward when the engine is coasting. The torque may then be accurately indicated as by means of a pressure gauge attached to the front wheel tires of the vehicle or by some other means for measuring the force at the front end of the vehicle exerted in an up or down direction during the testing procedure. By providing the adapters in the form of cup-shaped members supported concentrically with the rear axles of the vehicle, the open ends of the cups face the drive wheels of the vehicle and are of a size such that they receive the tires when partially deflated or with a small clearance if inflated, and are effectively connected to the vehicle wheels by tire pressure upon reinflation or by frictional contact in the case of a clearance fit. This provides a resilient connection between the vehicle and the power absorption means, and eliminates the tire wear present in apparatus of the type using rolls for transmitting power from the vehicle wheels to the power absorption means.

In addition, by eliminating the usual rolls for supporting and being driven by the vehicle wheels, the size and mass of the vehicle supporting structure has been greatly reduced, with the result that the apparatus may be readily transported from one place to another. Upon reaching a desired destination, it may be leveled and supported by means of the jacks 25, after which a vehicle to be tested may be run up the ramps 47 into a position such as shown in FIGURE 1. The hoisting mechanism 24 is then available to raise the rear end of the vehicle to expose the rear driving wheels and locate them concentrically with the shafts 70, which shafts have previously been moved to their outermost positions by means of the hand cranks 130 and the devices operated thereby. Then, the adapters 71 and 73 may be moved to the position shown in FIGURE 3 by means of the cranks 130 and associated devices. Thereafter, by releasing the hoist to put the sprung weight of the vehicle back on its wheels, an effective driving connection is completed between the vehicle engine and the power absorption compressors.

The frames supporting the cranks 130 may then be swung to positions parallel to the frame of the apparatus by withdrawing the pins 158 (FIGURE 8) and swinging the frames about the pivots 134.

With the vehicle located and connected as just described, it is ready for such operational tests as may be desired.

In FIGURES 15 to 18 there are illustrated modified forms of the driving means for the compressors. Thus, in FIGURE 15 the shaft 70 is shown carrying an adapter consisting of a rim 208 and a tire 209. A cup-shaped member 210 is provided for attachment to the brake drum 211 of the vehicle by means of the wheel bolts 212.

As shown in FIGURE 16, a circular plate adapter 213 is carried on the end of the shaft 70 and has wheel stud members 214 provided with screw threads 215 at their left-hand ends for securing them to the wheel bolts 212 of the test vehicle. The members 214 have cylindrical portions 216 of reduced diameter fitted into bores 217 of the plate adapter 213 where they are secured by bolts 218 and washers 219.

In the form shown in FIGURES 17 and 18 a three jaw chuck 220 is secured to the end of the shaft 70. This chuck is of a well-known form and has three radially adjustable jaws 221 to which tire adapter jaws 222 are attached by bolts 223. The adapter jaws comprise radial portions 224 and arcuately shaped tire engaging portions 225. Preferably the radial portions have a plurality of bolt holes 226 in addition to the ones occupied by the bolts 223 to permit the adapter jaws to be moved toward the axis of the chuck with respect to the chuck jaws 221 to fit smaller vehicle tires.

I claim:
1. A vehicle test apparatus for performance testing of a complete vehicle comprising, a frame, a pair of coaxial, laterally spaced shafts, means rotatably supporting said shafts on said frame in positions to receive therebetween the driving wheels of a vehicle to be tested, adapter devices on said shafts for coupling said shafts coaxially to said wheels, a power absorption means, controls for adjusting the power absorption of said means, driving connections between said shafts and said power absorption means, said adapter devices also supporting the driving wheel end of the vehicle, thus making the vehicle its own moment arm, from which torque reaction to supporting structure may be measured at any point, and means for measuring the torque reaction.

2. A mobile test apparatus as defined in claim 1 wherein said power absorption means includes an air compressor and embodies means for controlling the flow of air through the compressor.

3. A vehicle test apparatus as defined in claim 1 having means adjacent the front of the vehicle for measuring the torque reaction.

4. A vehicle test apparatus as defined in claim 1 having an internal combustion engine supported on said frame, and means forming driving connections between said engine and said coaxial, laterally spaced shafts to enable said engine to drive the vehicle wheels.

5. A vehicle test apparatus for performance testing of a complete vehicle comprising, a horizontal frame adapted to receive a vehicle to be tested, a pair of coaxial, laterally spaced shafts, means rotatably supporting said shafts on said frame adjacent one end thereof and in positions to receive therebetween the driving wheels of a vehicle to be tested, means for coupling said shafts coaxially to such vehicle wheels to be driven thereby and to support the driving wheel end of the vehicle thereby, thus making the vehicle its own moment arm, means for moving the shafts axially to move the coupling means into coupling position, air compressor means on said frame having controls for adjusting the power absorption of the compressor means when driven, and means forming driving connections between said shafts and said compressor means.

6. A vehicle test apparatus as defined in claim 5 having means for measuring the torque reaction which results in an upward or downward force at a part of the vehicle remote from the driving wheels.

7. A mobile test apparatus as defined in claim 5 wherein the frame provides a pair of closed ducts extending from the air compressors for receiving air pumped therefrom, and means at the other end of said ducts operative to expel said air in a direction toward the radiator of the vehicle under test.

8. A vehicle test apparatus as defined in claim 5 having an internal combustion engine supported on said frame, and means including a torque converter forming a driving connection between said engine and said shafts and operable to drive the vehicle wheels.

References Cited by the Examiner
UNITED STATES PATENTS

| 750,749 | 1/1904 | Brush | 73—117 |
| 1,775,541 | 9/1930 | Zechlin | 73—130 |
| 3,020,753 | 2/1962 | Maxwell | 73—117 |
| 3,180,138 | 4/1965 | Hundley | 73—117 |

FOREIGN PATENTS

| 603,714 | 10/1934 | Germany. |
| 609,266 | 2/1935 | Germany. |
| 198,995 | 11/1923 | Great Britain. |

RICHARD C. QUEISSER, *Primary Examiner.*

JAMES J. GILL, *Examiner.*

J. W. MYRACLE, *Assistant Examiner.*